United States Patent
Hewitt et al.

[15] 3,651,396
[45] Mar. 21, 1972

[54] FOURIER TRANSFORM NUCLEAR MAGNETIC RESONANCE SPECTROSCOPY

[72] Inventors: Richard C. Hewitt, Colonia; Saul Meiboom, Berkeley Heights, both of N.J.

[73] Assignee: Bell Telephone Laboratories Incorporated, Murray Hill, Berkeley Heights, N.J.

[22] Filed: Sept. 4, 1969

[21] Appl. No.: 855,206

[52] U.S. Cl. .................................. 324/0.5 R, 235/151.35
[51] Int. Cl. ........................................................ G01n 27/78
[58] Field of Search ............................ 324/0.5; 235/151.3

[56] References Cited

UNITED STATES PATENTS 3,461,381  8/1969  Nelson........................324/0.5
3,474,328  10/1969  Webb..........................324/0.5
3,475,680  10/1969  Anderson....................324/0.5

Primary Examiner—Michael J. Lynch
Attorney—R. J. Guenther and William L. Keefauver

[57] ABSTRACT

Improved NMR spectroscopy is realized by selectively positioning a spectrum excitation pulse with respect to the spectrum of frequencies to be observed. The excitation pulse may be positioned at a frequency anywhere within or outside the spectrum of interest as required. This is achieved by relating the excitation pulse to a reference signal having a frequency other than the excitation frequency and by maintaining a fixed phase relationship between the excitation pulse and the reference signal.

10 Claims, 4 Drawing Figures

FOURIER TRANSFORM NUCLEAR MAGNETIC RESONANCE SPECTROSCOPY

BACKGROUND OF THE INVENTION

This invention relates to measurement systems and, more particularly, to nuclear magnetic resonance spectroscopy.

Many nuclear magnetic resonance (NMR) spectroscopy systems are known in the art. In these systems, gyromagnetic properties of isotopes of elements are turned to account for identifying the nuclei of the elements and also for revealing their chemical structures and other related properties of molecules. Generally, a sample of matter in a undirectional magnetic field is irradiated with an alternating magnetic field to excite the nuclei of the matter. The excited nuclei develop precessional signals which are processed to identify the nuclei.

Systems for and methods of making NMR measurements are described in the literature. For example, several NMR spectroscopy systems and measurement techniques are described by the NMR and EPR staff of Varian Associates in "NMR and EPR Spectroscopy," Pergamon Press (1960). An improved NMR spectroscopy system utilizing Fourier transform techniques is described by R. R. Ernst and W. A. Anderson in an article entitled "Application of Fourier Transform Spectroscopy to Magnetic Resonance," "The Review of Scientific Instruments," Vol. 37, No. 1, Jan. 1966. In the latter system, a substantial improvement in sensitivity is achieved by irradiating a sample of matter under test a plurality of times and time averaging the plurality of transient precessional signals which are developed.

It is imperative that time averaging of the precessional signals is achieved in a phase coherent manner. Otherwise, the sensitivity of the system is degraded. Since phase detection is generally used in processing the precessional signals, a reference signal is required. In order to achieve coherent time averaging, the reference signal and the signal used to excite the nuclei must be maintained in a preestablished fixed phase relationship. If such a phase relationship is not maintained, a random relationship exists between the individual frequency components of successive precessional signals. Thus, system sensitivity is diminished because time averaging of the randomly related components results in a cancelling effect rather than in an additive one.

Heretofore, the necessary fixed phase relationship between the excitation signal and the reference signal was achieved by simply utilizing the same signal for both functions. This is undesirable because it restricts the selection of the excitation signal frequency to one outside of the spectrum of frequencies to be observed. Otherwise, the relative phase of the individual frequency components within the spectrum could not be determined with respect to the reference signal. This is true in systems in which the sample-under-test is irradiated a plurality of times or in systems in which it is irradiated only once. Accordingly, the relative phase of the "similar" frequency components of precessional signals resulting from successive excitations can not readily be determined and, hence, coherent addition of those components may not be effected. Additionally, increased power may be required to excite, if at all, frequency components, which are widely removed from the excitation frequency, in a sample when the excitation signal frequency is restricted to one outside the spectrum of interest.

SUMMARY OF THE INVENTION

These and other problems are resolved in accordance with the inventive principles described herein in a nuclear magnetic resonance spectroscopy system by utilizing a reference signal having a predetermined frequency other than the frequency of the excitation signal but which is maintained in a predetermined phase relationship with the excitation signal.

In one embodiment of the invention, this is achieved by selectively controlling the initiation of the interval during which the excitation signal is supplied in magnetic form to the matter under test to develop transient precessional signals. In accordance with the invention, a phase coherent relationship between subsequent transient signals is maintained by initiating the irradiation interval in accordance with a preestablished fixed phase relationship between the excitation signal and the reference signal. More specifically, a control signal is generated in response to a signal generated by combining the excitation signal and the reference signal, namely, a "beat" frequency signal. For each irradiation interval, the control signal is generated in response to a preestablished condition of the beat frequency signal. For example, a trigger circuit may be adjusted to develop a pulsive signal at a zero crossing or any specific amplitude of the beat frequency signal. The pulsive signal is supplied to control means which, in turn, develops a signal to activate selectively a gate which allows the excitation signal to be supplied in magnetic form for irradiating a sample of matter under test. Preferably, frequency control means are utilized to maintain the reference signal at a predetermined frequency which is a fixed increment greater or less than the frequency of the excitation signal.

In a second embodiment of the invention, the excitation signal and the reference signal, are selectively developed in a frequency synthesizer of a type which is capable of switching from a first predetermined frequency to a second predetermined frequency in a phase coherent manner. That is to say, the frequency synthesizer is capable of switching from a first frequency to a second frequency and maintaining the same phase relationship between the two frequencies. In this system, a remotely programmable frequency synthesizer is controlled by supplying appropriate timing signals thereto for setting the synthesizer to supply a first signal at the predetermined excitation frequency and subsequently for setting the synthesizer to supply a second signal at the predetermined reference frequency. Accordingly, appropriate signals are generated by a computer or other timing means to control the intervals of the excitation signal and the reference signal for proper development of precessional transients in a sample of matter under test, and for proper processing of the developed transient precessional signals.

A feature of the invention is that the excitation signal frequency may be selectively set at one within or outside the spectrum of interest, as desired.

The invention will be more fully apprehended from the following detailed description of illustrative embodiments thereof read in connection with the appended drawings.

DETAILED DESCRIPTION OF THE INVENTION

Figure 1:
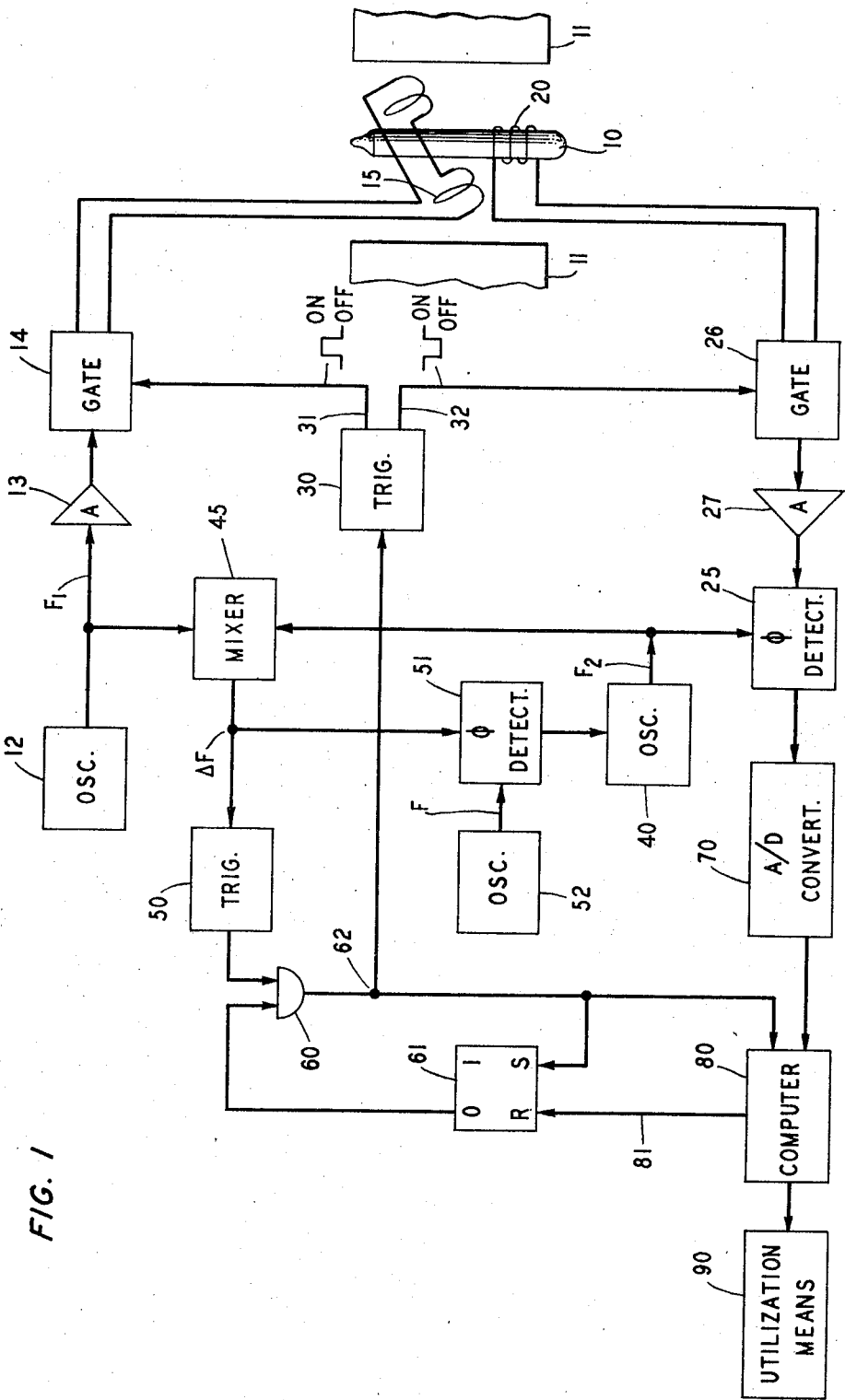
FIG. 1 is a simplified block diagram of a nuclear magnetic resonance spectroscopy system utilizing the principles of the invention.

FIG. 1 illustrates a nuclear magnetic resonance spectroscopy system in accordance with the invention. Typically, probe 10 holds a sample of matter, i.e., an isotope of an element to be tested. Probe 10 and, hence, the matter to be tested, is positioned in a stabilized, unidirectional magnetic field. The magnetic field is established between the pole faces of electromagnet 11, which for simplicity is only partly shown. Apparatus for regulating the magnetic field developed by electromagnet 11 is well known in the art and accordingly is not depicted.

The sample of matter under test is selectively irradiated, in a manner well known in the art, with a low energy alternating magnetic field developed in coils 15 while immersed in a strong polarizing magnetic field developed by electromagnet 11. A radio frequency signal generated by oscillator 12 is utilized to develop the alternating magnetic field which excites the nuclei of the test sample to replenish its precessing population. That is to say, the nuclei of the test sample are excited to develop transient precessional signals.

Although this invention is described in terms of employing a single excitation pulse during an irradiation interval, it is to be understood that a plurality of pulses may be used to excite selectively portions of the spectrum of interest, in a manner well known in the art.

Specifically, a signal having a predetermined radiofrequency ($F_1$), which may be inside the spectrum of interest or any other desired frequency, is supplied to probe 10 via power amplifier 13, gate 14 and transmitter coils 15. The value of frequency $F_1$ is selected in dependence upon the strength of the DC magnetic field and the specific isotope being examined. In practice, 60 and 100 MegaHertz signals are used in experiments with protons. Other radio frequencies, both higher and lower, may be employed for experiments with other isotopes or with other DC magnetic field strengths. A Varian Associates Model V4311 transmitter may be utilized for supplying the radio frequency signal to coils 15.

The transient precessional activity of the nuclei of the sample under test induces a voltage, similar to that caused by a moving magnet, in receiver coils 20. The signals "picked-up" by coils 20 are supplied for processing to phase detector 25 via gate 26 and amplifier 27. A Varian Associates model V4311 receiver unit may be utilized for this function. A reference signal having a predetermined frequency ($F_2$) is supplied from oscillator 40 to phase detector 25 for processing the received precessional signals in a well known fashion.

Gates 14 and 26 are utilized to prevent interaction between the transmitted and received signals and to control the irradiation interval. Control signals generated by trigger circuit 30 are supplied to gates 14 and 26 via circuit paths 31 and 32, respectively. The gate control signals are complementary. That is to say, the control signal supplied to gate 14 causes it to turn ON allowing propagation, while the control signal supplied to gate 26 causes it to turn OFF blocking propagation. Simply stated, when gate 14 is ON, gate 26 is OFF and vice versa.

Trigger circuit 30 is controlled to insure that a predetermined phase relationship is maintained between the excitation signal ($F_1$) and the reference signal ($F_2$). This is achieved in accordance with the invention by selectively generating a trigger pulse in response to a signal developed in accordance with a predetermined phase relationship between the excitation signal and the reference signal. Accordingly, a reference signal developed in controllable oscillator 40 is supplied to one port of mixer 45. The excitation signal from oscillator 12 is supplied to another port of mixer 45. A signal developed at the output of mixer 45, as is well known in the art, has a frequency equal to the difference between the frequency of the excitation signal and the frequency of the reference signal, that is, at a beat frequency $\Delta F$. Beat signal $\Delta F$ is supplied to trigger circuit 50 and to phase detector 51. Phase detector 51 develops a control signal in response to a standard signal supplied from oscillator 52 at frequency F and to the beat frequency signal. The resulting control signal is supplied to oscillator 40 for maintaining the reference signal at a predetermined fixed frequency, namely $F_2$. Oscillator 40 may be any of a number of voltage controllable oscillators known in the art. Thus, any variation in $F_2$ is detected by phase detector 51 and an appropriate frequency adjustment is made in oscillator 40, in a well known fashion, thereby stabilizing reference signal frequency $F_2$.

Trigger circuit 50, which may be any of the numerous types known in the art, is preset to respond to a predetermined condition of the beat frequency signal. For example, trigger circuit 50 may be adjusted to supply a pulsive signal to AND gate 60 at the zero crossing or at any fixed amplitude of the beat frequency signal. AND gate 60 responds to the simultaneous application of signals representative of logic "1's" on both of its inputs. Thus, assuming for the moment that the zero output of flip-flop 61 is high or representative of a logic 1, AND gate 60 generates a high signal, i.e., a logic 1, in response to a pulsive signal from trigger circuit 50, which is supplied to circuit path 62. The signal generated by AND gate 60, in turn, is supplied to trigger circuit 30, the set input of flip-flop 61 and to computer 80. Flip-flop 61 is accordingly set, thereby causing its zero output to go low, i.e., representative of a logic "0." This disables AND gate 60, thereby inhibiting the generation of excitation pulses until flip-flop 61 is reset by signals supplied from computer 80.

Trigger circuit 30 responds to the pulsive signal from AND gate 60 to generate complementary outputs for controlling gates 14 and 26. These output signals, which preferably have a very stable predetermined interval, are supplied to gates 14 and 26 via circuit paths 31 and 32, respectively. The output of trigger circuit 30 at 31 is normally low and that at 32 is normally high. Accordingly, gates 14 and 26 are normally OFF and ON, respectively. Activation of trigger circuit 30 causes its output at 31 to go high and its output at 32 to go low. Thus, gate 14 is turned ON and gate 26 is turned OFF for a predetermined interval. This interval is sufficient for exciting the nuclei of the sample of matter under test in probe 10 into precessional motion.

As previously stated, it is essential that the reference signal and the excitation signal be maintained in a predetermined fixed phase relationship in order to process properly the transient precessional signals induced in coils 20. This is achieved in accordance with the invention by the selective control of trigger circuit 30 for initiating an experiment in response to the preestablished phase relationship between the excitation signal ($F_1$) and the reference signal ($F_2$), namely the zero crossing of the beat frequency signal ($\Delta F$). In this manner, the necessary phase relationship is established and maintained during either a single experiment or a plurality of successive experiments. Thus, the relative phase of the frequency components of a precessional signal resulting from a single irradiation or those resulting from a plurality of irradiations may be properly detected and processed.

Phase detector 25 develops signals which are proportional to the instantaneous amplitude of the component of the precessional signal which is in phase with the reference signal. These signals are supplied to analog-to-digital converter 70. The converted signals are supplied to computer 80 where they are stored, time-averaged and the like. Computer 80 may be either a general or special purpose type. For example, either a Digital Equipment Corporation model PDP8 computer or a Varian model 6201 computer may be employed. Upon completing the collection of data for a given experiment, the data is supplied via a transmission link or the like to utilization means 90. In utilization means 90, the data may be recorded, plotted or otherwise processed as desired. Typically, utilization means 90 is a general purpose computer which may be programmed to make a Fourier transformation of the data and to provide an appropriate plot of the transformed information in a well known fashion. Details of Fourier transform techniques as applied to nuclear magnetic resonance spectroscopy are described in the R. R. Ernst and W. A. Anderson publication cited above.

Computer 80 also provides timing pulses for initiating an experiment. It is well known that numerous conventional timing systems are available for this purpose. Typically, an experiment is initiated by a signal developed in computer 80 which is supplied via circuit path 81 to reset flip-flop 61. Until flip-flop 61 is so reset, AND gate 60 is inhibited from generating a pulsive signal for activating trigger circuit 30.

Figure 2:
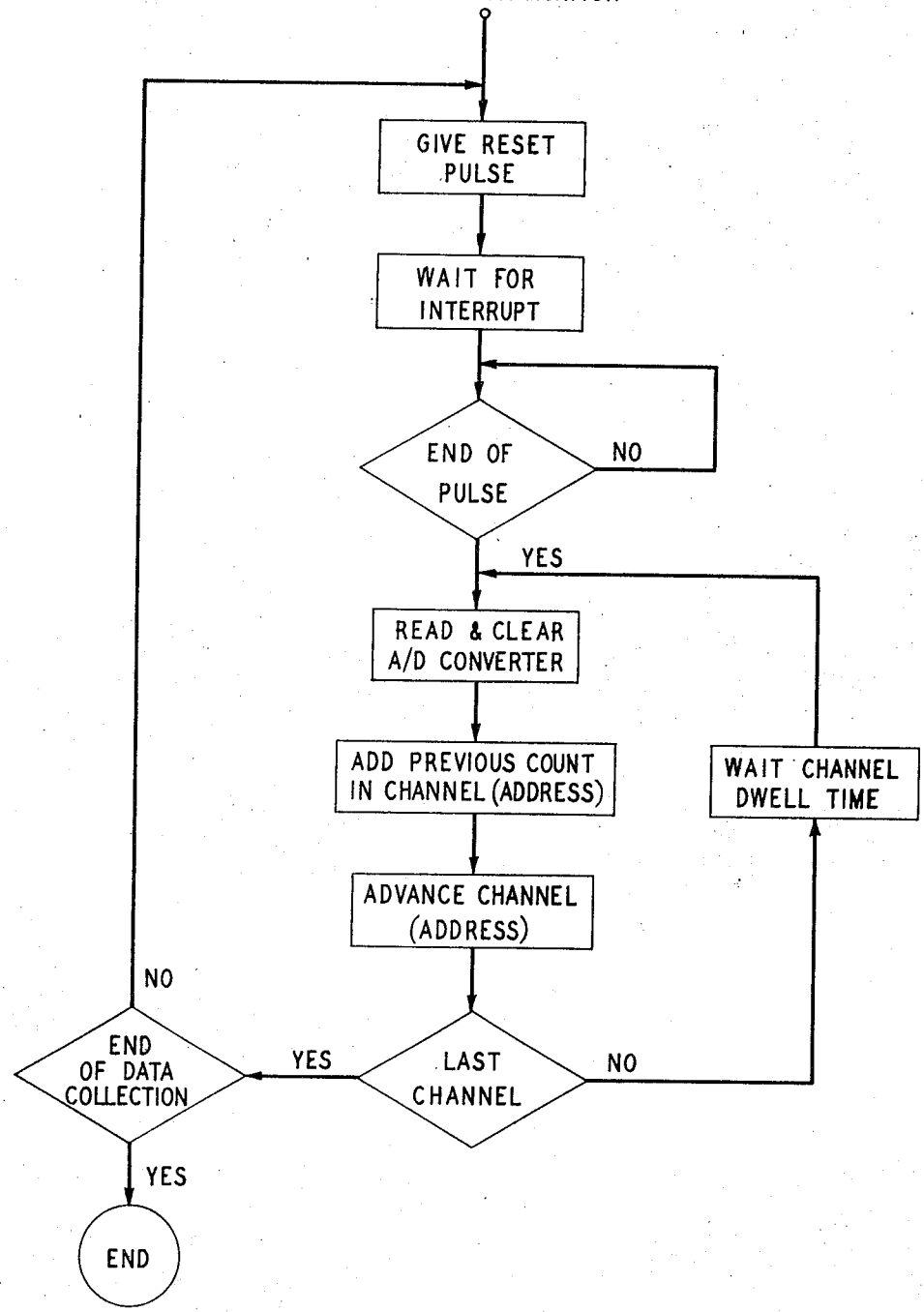
FIG. 2 depicts a flow chart which is useful in describing the operation of the system of FIG. 1.

FIG. 2 depicts a flow chart illustrating the operation of computer 80. The functions depicted in the flow chart of FIG. 2 may be reduced to a computer program by those skilled in the art. Thus, to run an experiment, in which a sample of matter is to be irradiated only once or a plurality of times and the frequency components of the individual resulting precessional signals are to be processed, time-averaged, and the like, the appropriate commands are supplied to computer 80. Any of the numerous access apparatus may be used for this purpose. In practice, a teletypewriter or other similar apparatus is used to activate computer 80 for initiating the collection, collecting, storing, and averaging the data of an experiment.

Accordingly, in response to an activating command, computer 80 (FIG. 1) supplies a reset pulse, via circuit path 81, to flip-flop 61. In turn, flip-flop 61 supplies a signal representative of a logic 1 to one input of AND gate 60. Assuming that a signal representative of a logic 1 is supplied to the other input of AND gate 60, it, in turn, generates a pulsive signal which is supplied to circuit path 62. This signal, in addition to triggering trigger circuit 30 and setting flip-flop 61, is utilized as an interrupt signal to indicate to computer 80 that irradiation has been initiated. Computer 80 then waits to the end of the irradiation interval upon which it reads and clears analog-to-digital converter 70. The digital information is then added to the previous count in the computer channel and the channel is advanced. The computer then interrogates itself to see if the last channel has been addressed. If so, it again interrogates itself to see if the data collection is completed. If the data collection has not been completed, for example, in an experiment wherein the sample of matter is to be irradiated a plurality of times, the test procedure is iterated. Upon the completion of data collection, the information may be transmitted out of computer 80 and thereafter utilized as desired.

Figure 3:
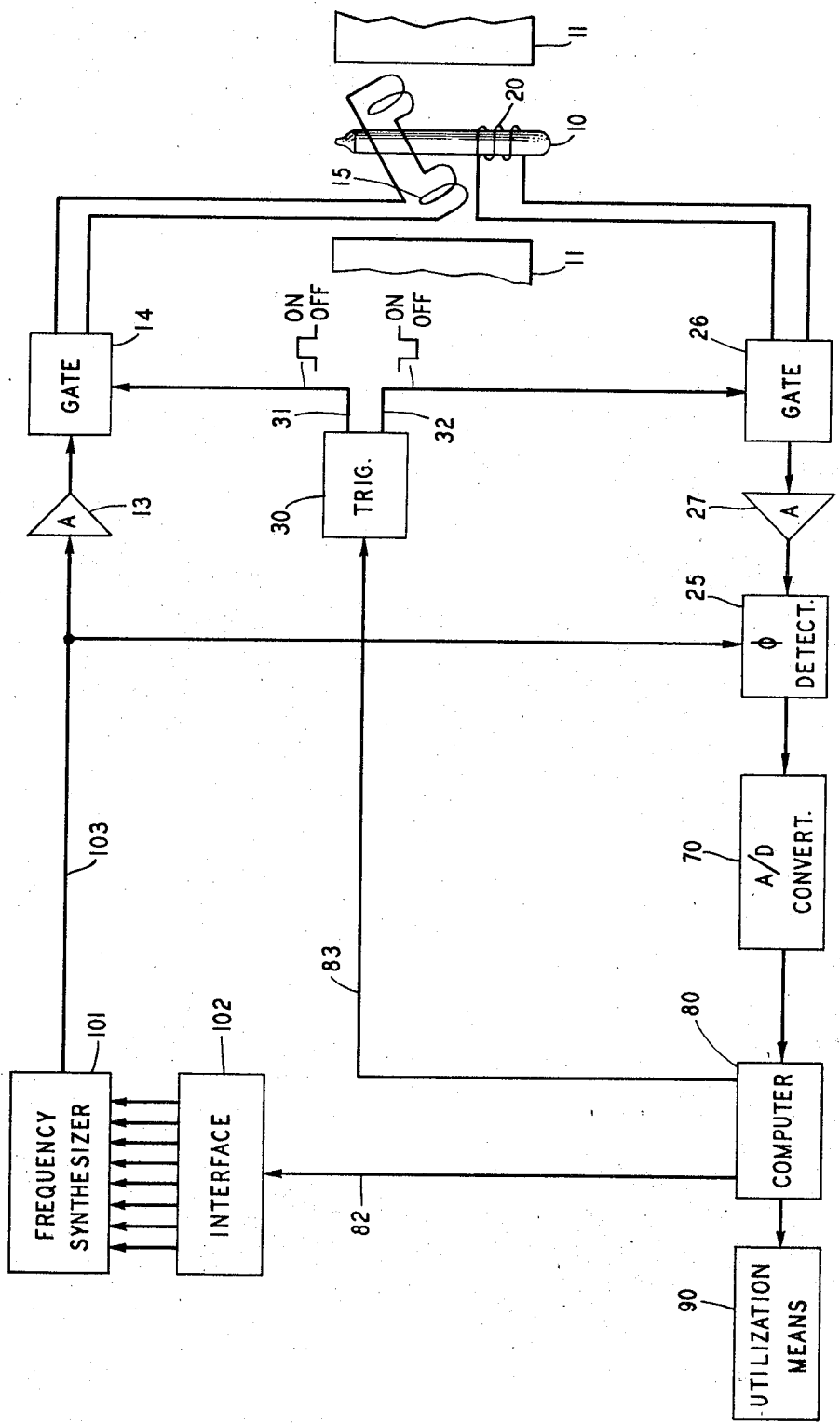
FIG. 3 is a block diagram of a nuclear magnetic resonance system utilizing apparatus alternative to that of FIG. 1.

FIG. 3 depicts another form of magnetic resonance spectroscopy system which utilizes the invention. System components which perform the same function as those depicted in FIG. 1 have been similarly numbered and will not again be explained in detail. In this embodiment, programmable frequency synthesizer 101 is utilized for generating both the excitation signal and the reference signal. Accordingly, frequency synthesizer 101 must be a type which is capable of being remotely controlled to switch, in a phase coherent manner, from a first signal having a first predetermined frequency to a second signal having a second predetermined frequency which is other than the frequency of the first signal. Preferably, synthesizer 101 is a Hewlett-Packard Model No. 5102A, which is described in greater detail in the "Model 5102A Operating and Service Manual" published by the Hewlett-Packard Company, dated 1966.

Interface network 102 provides proper interconnection between computer 80 and frequency synthesizer 101. That is to say, interface network 102 provides circuitry for externally programming synthesizer 101 via signals supplied from computer 80 on circuit path 82. Appropriate circuitry which may be included in interface 102 is described in greater detail in the "Model 5102A Operating and Service Manual" cited above. Although the Hewlett-Packard frequency synthesizer is preferred, any other similar type apparatus may be utilized by those skilled in the art.

Figure 4:
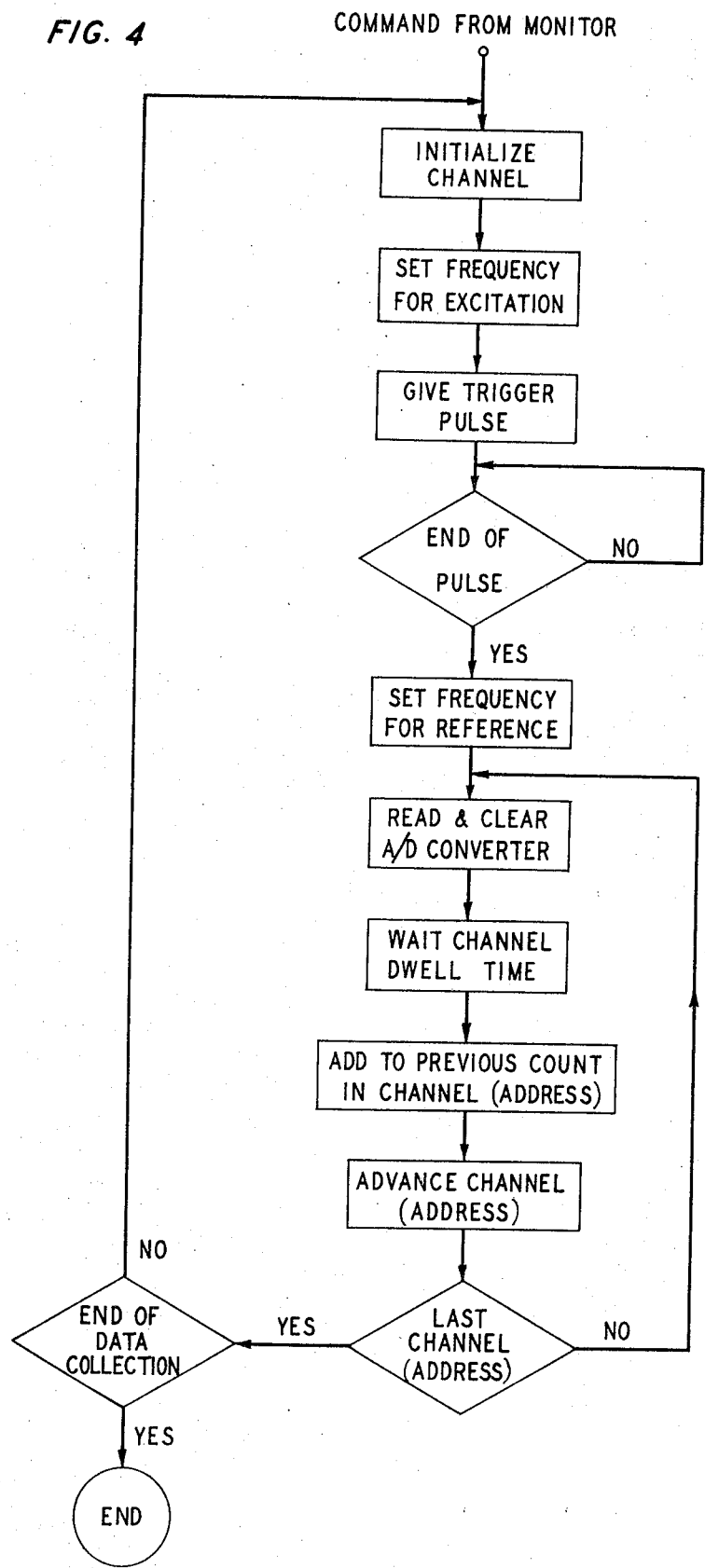
FIG. 4 depicts a flow chart useful in illustrating the operation of the system depicted in FIG. 3.

An experiment utilizing the system depicted in FIG. 3 is initiated by supplying appropriate commands to computer 80 via access apparatus which is not shown. Referring to the flow chart shown in FIG. 4, the computer channel is first initialized. Thereafter, a signal is supplied from computer 80 (FIG. 3) via circuit path 82 to interface network 102 and hence to synthesizer 101 where signals at the excitation frequency are produced. Once the frequency has been set to the excitation frequency, computer 80 supplies a trigger pulse via circuit path 83 to trigger network 30. As previously described, trigger network 30 generates appropriate pulsive signals for controlling gates 14 and 26. Thus, upon generation of the trigger pulse by computer 80, the excitation signal is supplied via circuit path 103, amplifier 13, gate 14 and coils 15 to irradiate a sample of matter under test accommodated in probe 10. As shown in FIG. 3, the excitation signal is also supplied to phase detector 25. This is of no consequence, because no precessional signals are received during the irradiation interval, since gate 26 is open and therefore no signal processing is occurring. Moreover, computer 80 is programmed so that any input data received during the irradiation interval is disregarded.

Referring again to FIG. 4, computer 80 now interrogates the channel to determine whether the irradiation interval has been completed. If so, it supplies a second signal via circuit path 82, (FIG. 3) and interface 102 for setting the frequency of synthesizer 101 to the reference frequency. Also, upon termination of the trigger pulse, gate 14 is opened and gate 26 is closed. Therefore, transient precessional signals "picked up" via coils 20 are supplied via gate 26 and amplifier 27 to phase detector 25 for processing. The output of phase detector 25 is supplied to analog-to-digital converter 70 and then to computer 80. Computer 80 then reads and clears analog-to-digital converter 70. Next, it waits for an interval, known as channel dwell time, before the digital information is added to the previous count in the channel and the channel is accordingly advanced. When the last channel is reached, the computer interrogates itself to determine whether the data collection process is complete. If not, the above process is iterated. If so, the information is read out and supplied to utilization means 90 to be utilized as desired.

As stated above, frequency synthesizer 101 switches from the excitation signal frequency to the reference signal frequency in a phase coherent manner. Since computer 80 supplies very accurate timing signals, the proper phase relationship between the reference signal and the individual frequency components of the transient precessional signal are maintained and proper processing is accomplished.

What is claimed is:

1. Spectroscopy apparatus which comprises,
   a source of an excitation signal having a predetermined frequency,
   a source of a reference signal having a predetermined frequency other than the frequency of said excitation signal,
   means responsive to said excitation signal for generating an alternating magnetic field, said alternating magnetic field being supplied to irradiate a sample of matter located in a uniform unidirectional magnetic field to develop at least one precessional signal having a plurality of frequency components,
   means for generating an irradiation control signal when said excitation and reference signals are in a predetermined phase relationship, said irradiation control signal having a predetermined time interval,
   controllable means responsive to said irradiation control signal for supplying said excitation signal to said alternating magnetic field generating means for said time interval, and
   means responsive to said at least one precessional signal and said reference signal for developing a signal proportional to the instantaneous amplitude of the component of said at least one precessional signal which is in phase with said reference signal.

2. Apparatus as defined in claim 1 wherein said irradiation control signal generating means includes means responsive to said excitation signal and said reference signal for generating an error signal representative of the instantaneous frequency difference between said excitation signal and said reference signal and means responsive to a predetermined value of said error signal for initiating generation of said irradiation control signal.

3. Apparatus as defined in claim 2 wherein said means for initiating generation of said irradiation control signal includes means responsive to said predetermined value of said error signal for generating a first signal for initiating the generation of said irradiation control signal, means for generating a second signal for initiating the generation of said irradiation control signal and gate means supplied with said first and second signals for inhibiting the generation of said irradiation control signal until said first and second signals are coincident.

4. Apparatus as defined in claim 1 including controllable frequency synthesizer means for generating said excitation signal and said reference signal.

5. Apparatus as defined in claim 4 wherein said irradiation control signal generating means further includes means for generating additional control signals, and further including means for supplying said additional control signals to said synthesizer means for initiating the generation of said excitation signal and for switching said synthesizer means from generating said excitation signal to generate said reference signal at the termination of said irradiation control signal interval.

6. Nuclear magnetic resonance spectroscopy apparatus which comprises,
- means for generating a unidirectional magnetic field at a predetermined field strength,
- means for accommodating a sample of matter in said unidirectional magnetic field for polarizing nuclei of said sample of matter,
- a source of a pulsive excitation signal having a predetermined frequency and a predetermined pulse interval,
- means responsive to said pulsive excitation signal for generating an alternating magnetic field for said pulse interval to excite said nuclei into precessional motion,
- means responsive to said precessional motion for developing at least one transient signal having a plurality of frequency components, and
- means for selectively processing said transient signals, said selective processing means including,
- means for generating a reference signal having a predetermined frequency other than the frequency of said alternating magnetic field,
- means for initiating the generation of said pulsive excitation signal so that said excitation signal and said reference signal are in a predetermined phase relationship at the instant said pulsive excitation signal is initiated and
- means responsive to said transient signals and said reference signal for developing a signal proportional to the instantaneous amplitude of the component of said transient signal which is in phase with said reference signal.

7. Apparatus as defined in claim 6 wherein said initiating means includes means responsive to said excitation signal and said reference signal for developing a beat frequency signal, said beat frequency signal being representative of the instantaneous difference in frequency between said excitation and reference signals, and means responsive to a predetermined value of said beat frequency signal for generating a pulsive control signal having an interval equal to said excitation pulse interval, and wherein said pulsive excitation signal source includes controllable means responsive to said pulsive control signal for supplying said excitation signal to said means for generating said alternating magnetic field for said pulse interval.

8. Apparatus as defined in claim 7 further including means for generating additional control signals, and wherein said pulsive control signal generating means includes means responsive to a predetermined value of said beat frequency signal for generating a signal for initiating the generation of said pulsive control signal and gate means supplied with said additional control signals and said initiating signal for inhibiting generation of said pulsive control signal until individual ones of said additional control signals and said initiating signal are coincident.

9. Nuclear magnetic resonance spectroscopy apparatus which comprises,
- a source of at least one pulsive excitation signal having a predetermined frequency and a predetermined pulse interval,
- means responsive to said excitation signal for generating an alternating magnetic field, said alternating magnetic field being supplied for said pulse interval to irradiate a sample of matter in a uniform magnetic field to develop at least one precessional signal therein having a plurality of frequency components,
- a source of a reference signal having a predetermined frequency other than the frequency of said excitation signal,
- timing means for generating control signals,
- means responsive to selected ones of said control signals for generating an irradiation initiation signal in accordance with a predetermined phase relationship between said reference signal and said excitation signal,
- gate means responsive to said irradiation initiation signal for supplying said excitation signal to said alternating magnetic field generating means for said pulse interval, and
- means responsive to said at least one precessional signal and said reference signals for developing a signal proportional to the instantaneous amplitude of the component of said at least one precessional signal which is in phase with said reference signal.

10. Apparatus as defined in claim 9 including controllable frequency synthesizer means for generating said pulsive excitation signal and said reference signal, and means for supplying others of said control signals to said synthesizer means for initiating generation of said excitation signal and for switching said synthesizer means from generating said excitation signal to generate said reference signal at the instant said pulse interval is terminated.

* * * * *